United States Patent [19]

Haid

[11] Patent Number: 4,599,841
[45] Date of Patent: Jul. 15, 1986

[54] PANEL STRUCTURE COMPRISING BOARDS AND FOR INSTANCE SERVING AS A FLOOR OR A PANEL

[75] Inventor: Peter Haid, Älmhult, Sweden

[73] Assignee: Inter-Ikea AG, Luzern, Switzerland

[21] Appl. No.: 597,659

[22] Filed: Apr. 6, 1984

[30] Foreign Application Priority Data

Apr. 7, 1983 [DK] Denmark ............................. 1545/83

[51] Int. Cl.⁴ ................................................. E04C 1/10
[52] U.S. Cl. ......................................... 52/403; 52/586
[58] Field of Search ................ 52/586, 403, 395, 396, 52/585; 403/292, 294, 298

[56] References Cited

U.S. PATENT DOCUMENTS

| | | | |
|---|---|---|---|
| 1,018,987 | 2/1912 | Philpot et al. | 52/177 |
| 1,723,306 | 8/1929 | Sipe | 52/586 X |
| 1,743,492 | 1/1930 | Sipe | 52/396 X |
| 1,946,646 | 2/1939 | Storm | 52/586 X |
| 3,023,681 | 3/1962 | Woeson | 52/396 X |
| 4,454,699 | 6/1984 | Strobl | 403/298 X |

FOREIGN PATENT DOCUMENTS 209959 12/1966 Sweden ................................. 52/396

*Primary Examiner*—Carl D. Friedman
*Assistant Examiner*—Creighton Smith

[57] ABSTRACT

A panel structure comprising boards and for instance serving as a floor or a panel, the boards being arranged on the same plane edge to edge. The boards are held together two by two by means of a joining moulding of a substantially T-shaped cross section. The transverse web of the joining moulding is provided with a plurality of holding teeth to both sides of the vertical web of said moulding. Each half of the transverse web projects into its longitudinal locking, relatively deep, and substantially smooth groove in a board. The width of the groove is slightly smaller than the thickness of said transverse web. The joining moulding is of a relatively soft material such as plastics or rubber. In this manner the panel structure is so simple to mount that the mounting can be carried out by unskilled persons. Without damaging the panel structure, the boards may work relative to each other when exposed to variations in air moisture and/or temperature.

5 Claims, 6 Drawing Figures

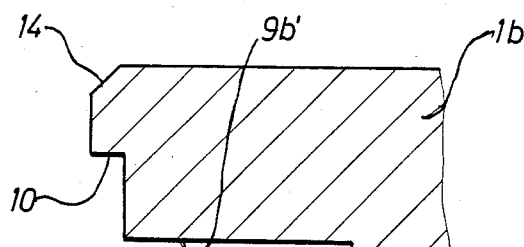
Fig. 4
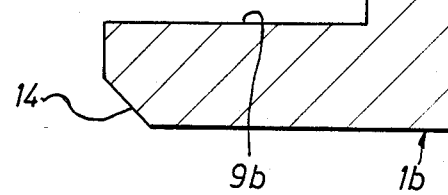
Fig.5
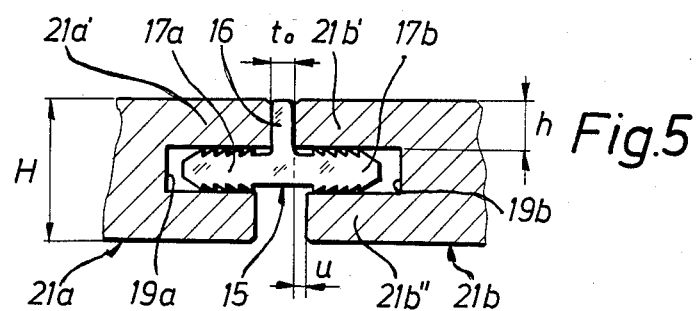
Fig.6
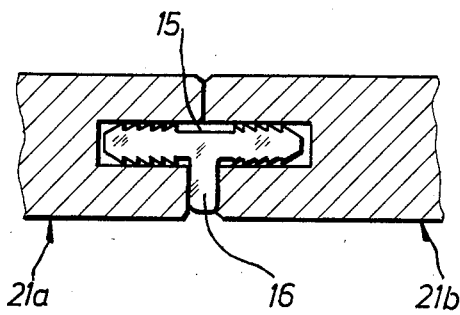

PANEL STRUCTURE COMPRISING BOARDS AND FOR INSTANCE SERVING AS A FLOOR OR A PANEL

FIELD OF THE INVENTION

The invention relates to a panel structure comprising boards and for instance serving as a floor or a panel, the boards being arranged on the same plane edge to edge and held together two by two by means of a joining moulding of a substantially T-shaped cross section.

BACKGROUND ART

A floor of plates is known, whereby sealing means are arranged in the spacing between the plates. These sealing means are substantially L-shaped in cross section. The horizontal web of the L comprises projecting teeth protruding into corresponding locking recesses in one of the floor plates so that the web cannot be displaced. This floor is rather difficult to mount and does not permit a working of the floor plates when the moisture and/or the temperature of the atmosphere varies.

Furthermore a floor of boards is known whereby the spacing between two neighboring boards has been filled out by a sealing means shaped as an inverted T. The transverse web of the T is completely smooth, i.e. without teeth, protrudes slightly into a longitudinal recess of a very small depth in each of the two boards. The floor is, however, not quite easy to mount on a support because the sealing means cannot immediately hold two neighboring floor boards together during the mounting.

SUMMARY OF THE INVENTION

The object of the invention is to provide a panel structure of boards of the above type and which is so simple to mount that the mounting can be carried out by unskilled persons, and which furthermore permits a working of the boards relative to each other when the moisture and/or the temperature of the atmosphere varies without said boards being damaged.

The panel structure according to the invention is characterized in that the transverse web of the joining moulding is provided with a plurality of holding teeth to both sides of the vertical web of said moulding, and that each half of the transverse web projects into its longitudinal locking, relatively deep and substantially smooth groove of a board, the width of said groove being such that it is slightly smaller than the thickness of said transverse web, and that the joining moulding is of a relatively soft material such as plastics or rubber. As a result, the panel structure is very simple to mount because neither nails nor pins are necessary. The mounting is so simple that it can be carried out by unskilled persons. In addition, the boards can work relative to each other when the moisture and/or temperature of the atmosphere varies without damaging the panel structure since the top of the teeth on the transverse web of the joining moulding may slide in the groove of each board. The top of each tooth presses against the smooth wall of the groove by such a force that the boards may work relative to each other without being torn from each other.

According to the invention each groove may be placed substantially at the middle of the cross section of each board, and the vertical web of the joining moulding may be of a height smaller than or equal to half the height of the cross section of each board, the vertical web never protruding outside the large planar surfaces of the boards. In this manner the joint between two neighboring boards has an attractive appearance.

Moreover according to the invention the groove of each board may be defined by an upper and a lower board web, and the upper board web may corbel a distance relative to the lower board web which corresponds to at least half the thickness of the vertical web of the joining moulding. As a result, it is possible to join two neighboring boards in two different manners according to desire as the joining moulding can be situated either so that its vertical web faces upwards, whereby said web appears between the two boards, or so that the vertical web faces downwards whereby the upper board webs can be pushed so as to abut each other and thus hide the joining moulding when the panel structure is seen from above.

According to the invention, holding teeth may only be provided on the top side of the transverse web or only on the bottom side of said transverse web, whereby a good connection of the transverse web to the groove is obtained without said web being too well connected thereto.

Furthermore according to the invention, at least three holding teeth may be provided on the top or bottom side of each half of the transverse web, which in practice turned out to be particularly advantageous.

The holding teeth are preferably situated in immediate succession whereby the squeezing of the transverse web in two neighboring boards is strengthened.

According to the invention the holding teeth may obliquely face the vertical web of the joining moulding, whereby the transverse web can be wedged into its position in the groove in a relatively easy manner, but it may be rather difficult to pull out again.

According to the invention the holding teeth may be serrated, which turned out to be advantageous in practice.

Moreover according to the invention, the transverse web of the joining moulding may be of a thickness ranging from 1.6 to 2.2, preferably 1.8, times the thickness of the vertical web of said moulding, and each half of the transverse web may be of a width ranging from 3.0 to 5.0, preferably 4.3, times the thickness of the vertical web. In this manner it is ensured that the joining moulding possesses a very high durability when the panel structure is a floor, and even when a lot of people walk on the floor.

According to the invention, the groove of each board may at its bottom comprise an auxiliary groove of a width smaller than the width of the remaining portion of the groove. In this manner sawdust and dirt, if any, present in the groove do not interfere with the pushing of one half of the transverse web of the joining moulding into the groove since said sawdust and dirt are pressed out into the auxiliary groove.

Finally according to the invention, the upper wall of the groove may comprise a longitudinal recess adjacent the mouth of said groove, whereby the insertion of one half of a transverse web into a groove is facilitated, said recess catching the transverse web during the insertion.

BRIEF DESCRIPTION OF DRAWING

The invention will be described below with reference to the accompanying drawing, in which FIG. 4 is a sectional view on the same scale as FIGS. 2 and 3 of one end of a board of the panel structure, FIG. 5 is a cross-sectional view of a second joint between two boards of a panel structure according to the invention, whereby the joining moulding is situated in such a manner that its vertical web faces upwards and the boards are slightly separated, and FIG. 6 is a cross-sectional view of the joint of FIG. 5, whereby the joining moulding is situated in such a manner that its vertical web faces downwards and the boards abut each other.

DESCRIPTION OF PREFERRED EMBODIMENTS

Figure 1:
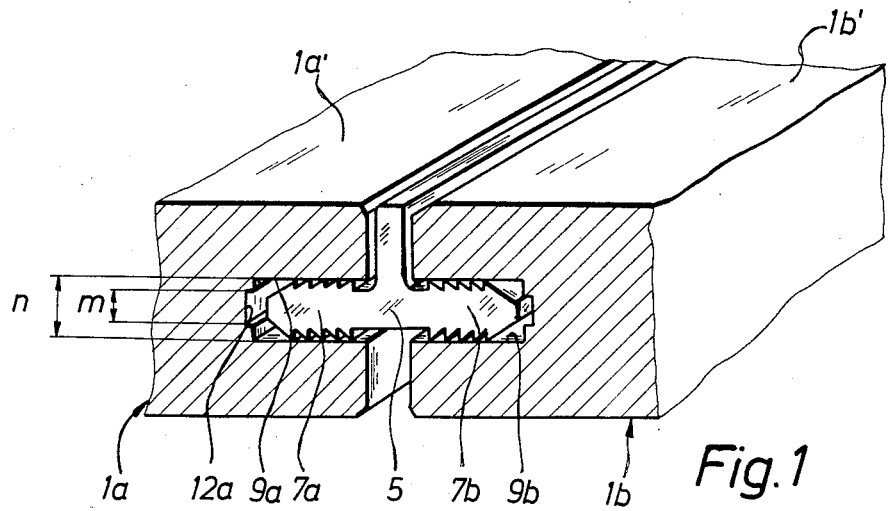
FIG. 1 is a perspective view of a joint between two boards of a panel structure according to the invention.

The panel structure illustrated in FIG. 1 can be used for building a floor or a panel. It comprises many boards arranged on the same plane edge to edge only two boards 1a and 1b appearing for the sake of clarity. The boards 1a and 1b are held together by means of a joining moulding 5 being substantially T-shaped in cross section, the T, however, being inverted. The joining moulding 5 has not been hatched for the sake of clarity.

Figure 2:
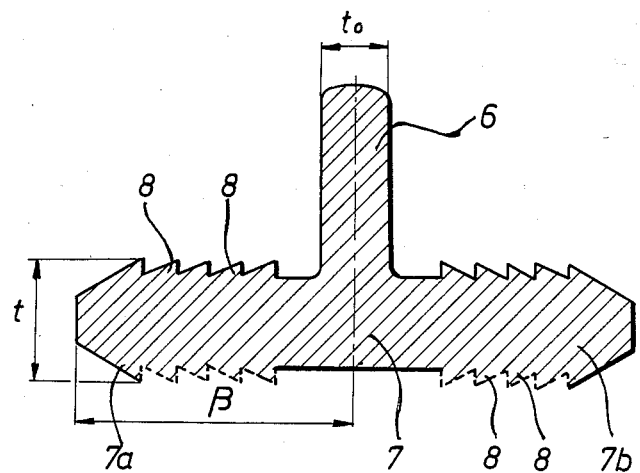
FIG. 2 is a cross-sectional view on a larger scale of the joining moulding illustrated in the joint of FIG. 1.

The joining moulding comprises a vertical web 6 and a transverse web 7, cf. FIG. 2, whereby the latter comprises two halves 7a and 7b. As illustrated, each half 7a and 7b of the transverse web is provided with a plurality of holding teeth 8. Each half 7a and 7b, respectively, of the transverse web projects into its longitudinal locking, relatively deep and substantially smooth groove 9a, 9b in a board, cf. FIG. 1. The half 7a of the transverse web thus projects into the groove 9a of the board 1a, whereas the half 7b of the transverse web projects into the groove 9b of the board 1b. The width n of the groove is such that it is slightly smaller than the thickness t of the transverse web 7. As the joining moulding furthermore is of a relatively soft material such as plastics or rubber, the teeth 8 on the halves 7a and 7b of the transverse web 7 are slightly deformed when situated in the groove. Consequently, the joining moulding is relatively fixedly connected to each board, but the connection formed by the joining moulding between two boards implies, however, that the boards can work relative to each other in a relatively easy manner when the moisture and/or temperature of the atmosphere changes. Furthermore it is very easy to mount such a panel structure since in a first step one half of the transverse web of a joining moulding is connected with another board and in a second step the second half of the transverse web of the joining moulding is inserted in the groove of the second board.

In FIG. 2 both the top side and the bottom side of each half 7a and 7b of the transverse web is provided with holding teeth 8, nothing, however, prevents the holding teeth from being provided on the top side of the transverse web only or solely on the bottom side of said transverse web. The holding teeth 8 may be omitted on the bottom side of the transverse web, cf. the dotted indication in FIG. 1.

At least three holding teeth can be provided on the top side or bottom side of each half 7a or 7b of the transverse web. Five holding teeth are illustrated both on the top side and the bottom side of the half 7a of the transverse web in FIG. 2, where the holding teeth are arranged in immediate succession, but they can also be arranged at rather great intervals.

FIG. 2 also illustrates how the holding teeth 8 may face the vertical web 6 of the joining moulding obliquely.

Figure 3:
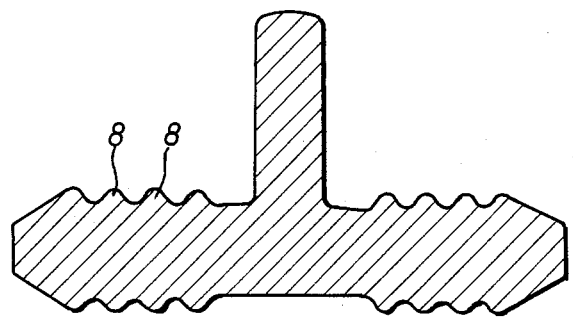
FIG. 3 is a cross-sectional view on a larger scale of a second embodiment of the joining moulding.

Each holding tooth is serrated in FIG. 2. One edge of the saw tooth is vertical and the other edge is inclined. As illustrated in FIG. 3, nothing, however, prevents the holding teeth 8' from being wavy. It is preferred that the transverse web 7 of the joining moulding is of a thickness ranging from 1.6 to 2.2, preferably 1.8, times the thickness $t_o$ of the vertical web 6 of said moulding, and that each half 7a and 7b of the transverse web 7 is of a width $\beta$ ranging from 3.0 to 5.0, preferably 4.3, times the thickness $t_o$ of the vertical web 6.

The groove 9b comprises at the bottom an auxiliary groove 12b, cf. FIG. 4, of a width m smaller than the width n of the remaining portion of the groove 9b. Sawdust and dirt, if any, can be collected in this auxiliary groove when the half 7b of the transverse web is pressed into the groove 9b. The upper wall 9b' of the groove 9b can be provided with a longitudinal recess 10 adjacent the mouth of the groove, said recess facilitating the securing of the joining moulding and the board. During the moving of the half 7b of the transverse web towards the groove 9b, the recess 10 assists in catching said half.

At 14 FIG. 4 illustrates how the upper and lower rim of the board 1b may be bevelled. The bevelling makes it easier for a user to hold the board when said board is to be connected with the joining moulding and the remaining boards of the panel structure. The upper bevelling provides, however, also the panel structure with an attractive design.

Two boards 21a and 21b are interconnected by means of a joining moulding 15, cf. FIG. 5, said moulding not being hatched for the sake of clarity. Each board comprises a groove 19a and 19b, respectively, substantially placed at the middle of the cross section of the boards. The moulding 15 comprises a vertical web 16, the height h of which is smaller than or equal to half the height H of the cross section of the boards 21a and 21b. The vertical web 16 is, however, never so long that it projects outside the great planar surfaces of the boards.

FIG. 5 illustrates too how the groove 19a, 19b of each board 21a, 21b is defined by an upper and a lower board web 21b', 21b'', whereby the upper board web corbels a distance u relative to the lower board web. The distance u is of a size at least corresponding to half the thickness $t_o$ of the vertical web 16 of the moulding 15. When the moulding 15 is situated in such a manner that the vertical web 16 faces upwards, cf. FIG. 5, the web 16 serves as a distance piece between the boards 21a and 21b. When the moulding 15 is situated in such a manner that the web 16 faces downwards, cf. FIG. 6, the boards can be pushed together, the two upper board webs 21a' and 21b' abutting each other.

Everywhere in the specification the expression "boards" is to be understood in its broad sense since it covers not only usual boards, but also quadrangular or rectangular plates. The boards need not necessarily be of wood, but may be of many other materials such as for instance plastics or masonite, which is a tough, dense, moisture-resistant fiber-board made from wood fibers exploded under high steam pressure.

I claim:

1. In combination: a first board having a first edge, a second board having a second edge opposite said first edge, each edge being provided with a smooth groove near the middle of the thickness of each board, the groove in one edge being located opposite the groove in the other edge, each of said grooves being defined by first and second spaced apart surfaces and a further groove means located between said first and second surfaces for catching debris, said second surface being larger than said first surface, said boards each including a first beveled edge located adjacent to said second surface, a recess means defined in said first board adjacent to said smooth groove first surface and extending longitudinally of said first board, and a second beveled edge on said first board adjacent to said recess means and a molding means for joining said first board to said second board, said molding means being of T-shaped cross section and having a first web means between said edges, and having a height sufficient to extend to a location adjacent to the top surfaces of the two boards for placing a first web means top surface in the plane of said board top surfaces, and second and third web means connected to said first web means and extending therefrom and respectively received in said grooves, said recess means capturing said second web means during joining of said boards, each of said second and third web means being received in the grooves and being provided with teeth means on one side of each of said second and third web means for frictionally and slidably engaging the boards in said grooves to permit movement of said boards relative to teach other which is permitted and controlled by said teeth means and by all of said web means, the width of said grooves being slightly smaller than the thickness of said web means, said molding means being formed of a relatively soft resilient material.

2. The combination according to claim 1, wherein the number of teeth on each of said two second and third web means is three on each side.

3. The combination according to claim 1, wherein said teeth extend obliquely with respect to said first means web.

4. The combination according to claim 1, wherein said teeth are serrated.

5. The combination according to claim 1, wherein the thickness of each of said second and third web means is from 1.6 to 2.2 times the thickness of said first web means, and wherein the length of each of said second and third web means is from 3.0 to 5.0 times the thickness of said first web means.

* * * * *